(12) United States Patent
Carlson et al.

(10) Patent No.: US 9,193,874 B2
(45) Date of Patent: Nov. 24, 2015

(54) SELF-RENEWING HYDROPHILIC ORGANIC COATINGS

(75) Inventors: William Brenden Carlson, Seattle, WA (US); Georgius Abidal Adam, Edensor Park (AU); Angele Sjong, Louisville, CO (US); Feng Wan, Issaquah, WA (US); Timothy Londergan, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 37 days.

(21) Appl. No.: 13/700,683

(22) PCT Filed: Jul. 16, 2012

(86) PCT No.: PCT/US2012/046856
§ 371 (c)(1),
(2), (4) Date: Nov. 28, 2012

(87) PCT Pub. No.: WO2014/014437
PCT Pub. Date: Jan. 23, 2014

(65) Prior Publication Data
US 2014/0018466 A1    Jan. 16, 2014

(51) Int. Cl.
| | |
|---|---|
| *C08F 20/00* | (2006.01) |
| *C09D 175/12* | (2006.01) |
| *C09D 5/16* | (2006.01) |
| *C08G 18/04* | (2006.01) |
| *C08F 120/36* | (2006.01) |
| *C09D 133/14* | (2006.01) |
| *C08G 18/48* | (2006.01) |
| *C08G 18/65* | (2006.01) |
| *C08G 18/67* | (2006.01) |
| *C08G 18/32* | (2006.01) |

(52) U.S. Cl.
CPC ............ *C09D 5/1662* (2013.01); *C08F 120/36* (2013.01); *C08G 18/04* (2013.01); *C08G 18/3206* (2013.01); *C08G 18/4854* (2013.01); *C08G 18/6511* (2013.01); *C08G 18/6705* (2013.01); *C09D 5/1681* (2013.01); *C09D 133/14* (2013.01)

(58) Field of Classification Search
CPC .. C09D 5/16662; C09D 175/12; C08G 18/12; C08G 18/807
USPC ............... 523/122; 525/440.02; 524/429, 548
See application file for complete search history.

(56) References Cited

U.S. PATENT DOCUMENTS

| | | | |
|---|---|---|---|
| 5,521,272 A * | 5/1996 | O'Connor et al. ............. 528/45 |
| 5,567,762 A | 10/1996 | Coyard et al. | |
| 6,060,556 A | 5/2000 | Collins et al. | |
| 6,818,686 B1 | 11/2004 | Colpaert et al. | |
| 7,144,955 B2 | 12/2006 | Grace et al. | |
| 2002/0091197 A1 | 7/2002 | Nakamura et al. | |
| 2006/0093844 A1 | 5/2006 | Conklin et al. | |
| 2010/0243221 A1 | 9/2010 | Yamasaki et al. | |

OTHER PUBLICATIONS

JP 08-287269, Nov. 1994, Japan, Usui et al.*
EP 1 388 551 A1 Aug. 2003 European Patent Katsuta et al.*
International Search Report and Written Opinion for PCT/US2012/046856 dated Sep. 17, 2012.
Palma, Effect of monomer feed rate on the properties of the copolymer butyl acrylate/vinyl acetate in semi-batch emulsion polymerization, *Indian Journal of Chemical Technology* (Sep. 2007), 14:1-7.

* cited by examiner

*Primary Examiner* — Nathan M Nutter
(74) *Attorney, Agent, or Firm* — Foley & Lardner LLP

(57) ABSTRACT

Hydrophilic coating compositions and methods to make and use the compositions are disclosed. The compositions include a polymer comprising a plurality of isocyanate groups and a blocking agent contacting at least one of the plurality of isocyanate groups.

10 Claims, 3 Drawing Sheets

SELF-RENEWING HYDROPHILIC ORGANIC COATINGS

CLAIM OF PRIORITY

This application is a U.S. national stage filing under 35 U.S.C. §371 of International Application No. PCT/US2012/046856 filed Jul. 16, 2012 entitled "Self-renewing Hydrophilic Organic Coatings".

BACKGROUND

Decorative coatings and paints are used by consumer and industrial users to beautify and protect substrates. The most simple coatings and paints sue made of a polymer (the binder) in a solvent (the vehicle), which is commonly called a lacquer. Paints and coatings are used to modify the appearance of an object by adding color, gloss, or texture and by blending with or differentiating from a surrounding environment. For example, a surface that is highly light scattering (i.e. a flat surface) can be made glossy by the application of a paint that has a high gloss. Conversely, a glossy surface can be made to appear flat. Thus, the painted surface is hidden, altered, and ultimately changed in some manner by the presence of the coating. In addition, decorative paints protect the surface from the surrounding elements and prevent the corrosive process.

Although paints and coatings alter the appearance of the surface, the coating itself can get dirty. The dirt can dull the coating by increasing the light scattering or modifying the color. Many attempts to create organic coatings that resist dirt and contamination have been undertaken. In one case, hydrophobic coatings with a low surface energy that resist water and, thus, are resistant to dirt have been created. For example, highly fluorinated polymers related to Teflon have been used for this purpose. These coatings often have a surface energy of no more than 15 dynes, which results in water forming beads on the surface rather than wetting the surface. Generally, these coatings take more time to become contaminated and maintain the appearance of the object longer, but they still eventually need to be cleaned. Thus, it would be desirable to have a coating with hydrophilic surface that cleans itself.

SUMMARY

The present disclosure provides paints and coatings that provide a hydrophilic, self-cleaning surface when coated on an object. In one embodiment, a coating composition may be a polymer having a plurality of isocyanate groups and a blocking agent contacting at least one of the plurality of isocyanate groups.

In an embodiment, a method of preparing a coating composition may involve contacting at least one vinyl isocyanate monomer with at least one blocking agent to form an ester monomer and polymerizing the ester monomer to form the coating composition.

In an embodiment, a method of coating a substrate may involve applying a coating composition to the substrate, wherein the coating composition comprises a polymer having a plurality of isocyanate groups and a blocking agent contacting at least one of the plurality of isocyanate groups.

In an embodiment, a composition may include an article of manufacture and a coating covering at least a portion of the article, wherein the crating comprises a polymer having a plurality of isocyanate groups and a blocking agent contacting at least one of the plurality of isocyanate groups.

DETAILED DESCRIPTION

This disclosure is not limited to the particular systems, devices and methods described, as these may vary. The terminology used in the description is for the purpose of describing the particular versions or embodiments only, and is not intended to limit the scope.

Decorative coatings and paints are high volume consumer products. As the name implies, a function of a decorative coating is to make an object look more visually appealing. However, in addition to accomplishing the beautification of an object, the coating can also afford some degree of substrate protection. As paints and coatings become covered and contaminated with unwanted substances, the appearance of the object often changes in undesirable ways. It is often expensive to clean the coated surface, and the detergents, surfactants, fragrances, alkali, lime, and/or other chemicals used to clean the surface make their way into the environment where they can potentially cause great damage. Thus, it is desirable to have a coating that keeps dirt from sticking to the surface, is self-cleaning, and contains environmental friendly chemicals. The present disclosure identifies hydrophobic polymer emulsions with a hydrophilic surface that is self-cleaning. The hydrophilic surface provides a large contact angle with water and helps water to sheath off, leaving it clean. The hydrophilic surface constantly renews itself as it is worn.

The present disclosure identifies methods and compositions for paints and coatings that provide hydrophilic, self-cleaning surface when coated on a substrate. In some embodiments, a coating composition may be a polymer having a plurality of isocyanate groups and a blocking agent contacting at least one of the plurality of isocyanate groups. In some embodiments, some of the isocyanate groups may be present on the side chains or within side chains of the polymer. In some embodiments, the isocyanate groups may cross-link the polymer.

In some embodiments, the polymer may be a vinyl polymer. Examples of vinyl polymers include, but not limited to, alkyl methacrylate polymer, allyl methacrylate polymer, vinyl methacrylate polymer, thioethyl methacrylate polymer, vinyl benzene polymer, 2-hydroxyethyl acrylate polymer, butyl acrylate polymer, 2-ethylhexyl acrylate polymer, and the like. Combinations of more than one polymer may also be used in the composition.

In some embodiments, the composition may not be a ternary polymer. The term "ternary polymer" means a mixture of three different polymers. In some embodiments, the composition may not contain one or more of the following: cyclic polysilicates, aliphatic polysilicates, UV initiators or metal catalyst. In some embodiments, the composition may not contain polymers without isocyanate groups.

Figure 1:
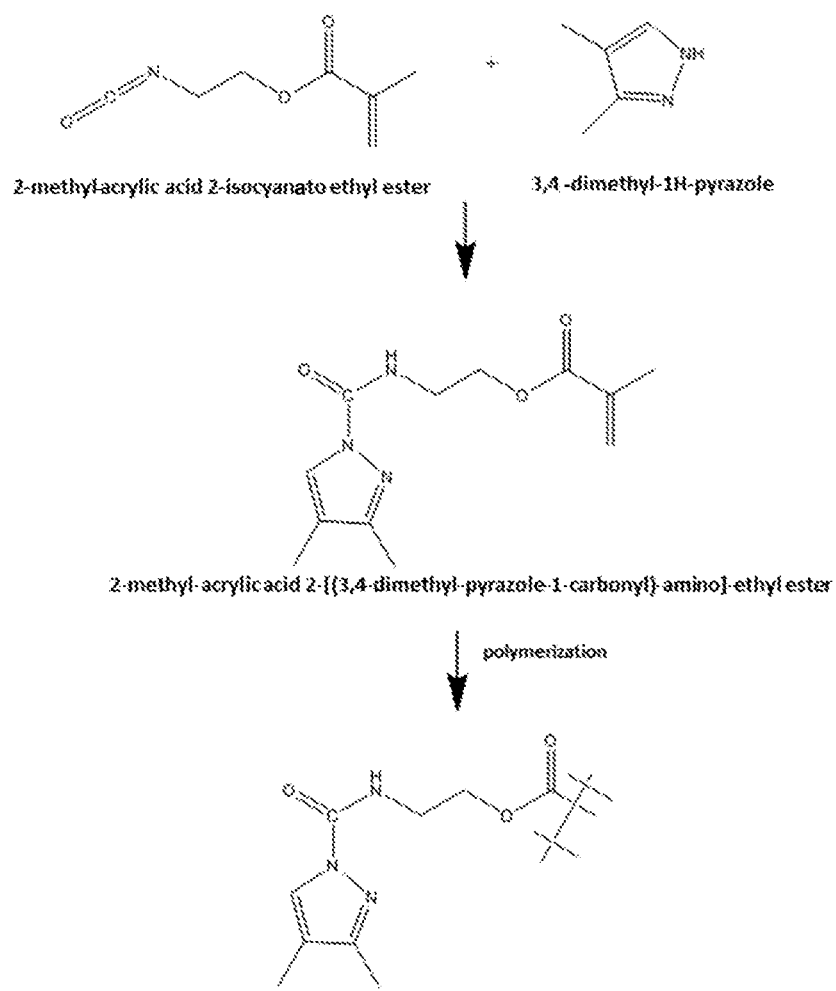
FIG. 1 deplete a synthesis of a blocked isocyanate acrylic polymer according to an embodiment.
Figure 2:
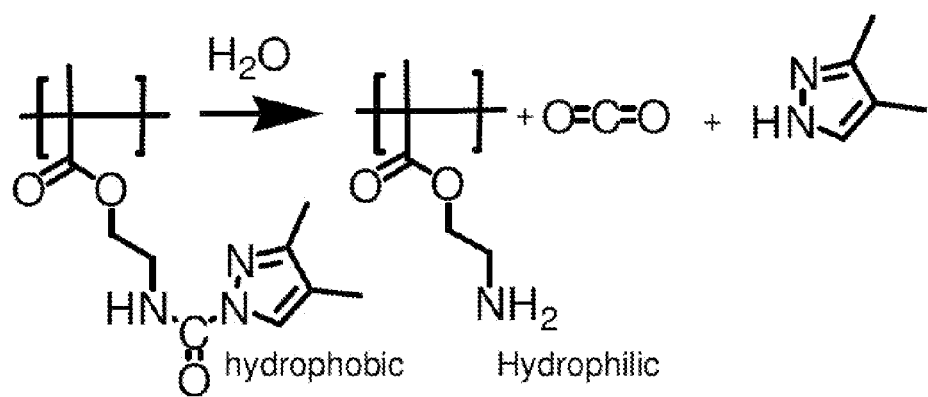
FIG. 2 depicts hydrolysis of the blocking agent to form hydrophilic amino groups according to an embodiment.
Figure 3:
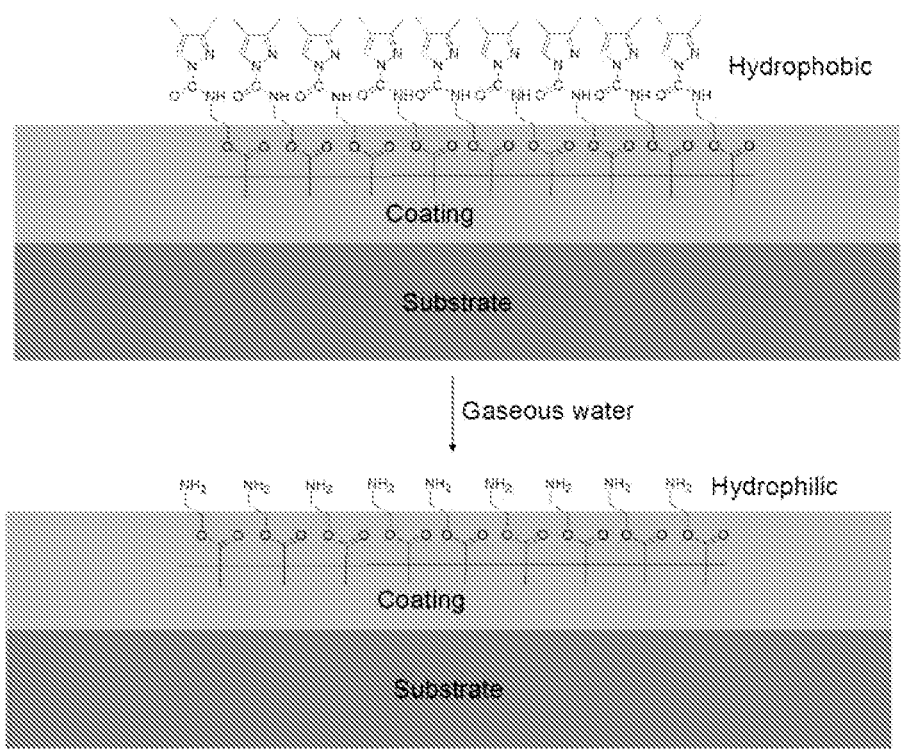
FIG. 3 Illustrates the coating of a surface with a paint composition containing blocked isocyanate vinyl polymer according to an embodiment.

In some embodiments, the isocyanate groups may be blocked with one or more blocking agents. The blocking group may impart hydrophobicity to the polymers. However, when exposed to atmospheric water, the blocked isocyanate moieties at the surface hydrolyze to hydrophilic amino groups. This is illustrated in FIG. 3 and FIG. 2. In some embodiments, the amino group may further oxidize to nitroso and nitro moieties which are also hydrophilic in nature. Thus, the hydrophobic polymeric surface may change to a hydrophilic surface upon reacting with atmospheric water and moisture. Examples of blocking agents that may be used include, but are not limited to, imidazole, 2-methyl imidazole, 4-methyl imidazole, pyrazole, pyrrole, pyrrolidine, morpholine, pyridine, piperidine, alkyl malonate esters, acetoacetic ester, cyanoacetic ester, and combinations thereof. In some embodiments, polymerizable blocking agents such as caprolactams and oximes may be used. An illustrative pyrazole blocking agent that may be used, in the coating composition is 3,4-dimethyl-1H-pyrazole.

As a result of the properties mentioned herein, the coating may provide a hydrophilic self-cleaning surface in addition to protecting the substrate. The ability of the amino moieties to oxidize may further provide excellent antioxidant properties to the coatings, leading to increased corrosion inhibition and enhanced protection of the substrate. These amino moieties may also provide improved adhesion to the substrate. Thus, in some embodiments, the bulk of the polymer may not react with water and as such can remain in a hydrophobic state until the surface is exposed to atmospheric water where it can form a hydrophilic surface.

Paints and coatings of the present disclosure may contain one or more additives that alter the properties of the paint, from shelf life to application and longevity, to health and safety. Such additives may be added, for example, during the manufacture of the emulsion polymer or during the formulation of the paint itself. Additives include, but are not limited to, initiators, theology modifiers, nitrates, preservatives, coalescing agents, stabilizers and the like. Initiators, such as persulfates, may be added to the coatings of the present disclosure. Initiators are a source of free radicals to initiate the polymerization process in which monomers condense to form the polymers. Coatings may also contain a redox system initiator, such as ferrous and thiosulfate along with the persulfate salts, that promote polymerization at room temperature.

In some embodiments, thickeners and rheology modifiers may be added to achieve the desired viscosity and flow properties. Thickeners function by, for example, forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the compositions.

In some embodiments, preservatives and fungicides may be added to the coating compositions in low doses to protect against the growth of microorganisms. Preservatives such as methyl benzisothiazolinones, chloromethylisothiazolinones, barium metaborate and 1-(3-chloroallyl)-3,5,7-triaza-1-azoniaadarmantane chloride may be used.

In some embodiments, stabilizers such as ethylene and propylene glycol may be used. Stabilizers help to reduce or prevent formation of ice crystals at low temperatures in waterborne paints, thereby retaining the dispersion stability and reducing damage to the polymers.

In some embodiments, coalescing agents, such as ester alcohols, benzoate ethers, glycol ethers, glycol ether esters and n-methyl-2-pyrrolidone, may be added to the coating compositions. Coalescing agents are added to, for example, insure film formation under varying atmospheric conditions. They may be slow evaporating solvents with some solubility in the polymer phase. They may act as a temporary plasticizer, allowing film formation at temperatures below the system's glass transition temperature, after which they slowly diffuse to the surface and evaporate, increasing the hardness and block resistance of the film.

In some embodiments, coatings of the present disclosure may further contain one or more of the following: solvents, pigments, plasticizers, surfactants and the like. Surfactants may be used, for example, to create the micelles for particle formation, as well as long-term particle stabilization and these provide stability through electrostatic and steric hindrance mechanisms. In some embodiments, ionic and nonionic surfactants may be used. Examples include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene and polyoxypropylene.

The paints according to the disclosure may further comprise one or more pigments. The term "pigments" is intended to embrace, without limitation, pigmentary compounds employed as colorants, including white pigments, as well as ingredients commonly known in the art as "opacifying agents" and "Fillers". Pigments may be any particulate organic or inorganic compound and provide the ability to coatings to obscure a background of contrasting color (hiding power).

In some embodiments, plasticizers may be added to the compositions to adjust the tensile properties of the paint film. Plasticizers may be, for example, glucose-based, glycerine-based, propylene glycol, ethylene glycol, phthalates and the like.

The coating compositions of the disclosure may also comprise extenders or fillers which serve, for example, to thicken coating films and support the structure of the coating composition. Some extenders may also provide hiding power and function as pigments, particularly above the critical pigment volume concentration, and most extenders are color neutral. Common extenders include, for example, clays such as kaolin clays, china clays, tales, quartz, barytes (barium sulphate) and carbonate salts such, for example, as calcium carbonate, zinc carbonate, magnesium carbonate or mixtures thereof.

In some embodiments, the coating may be in the form of a latex emulsion. The coatings of the present disclosure may be used as a decorative coating, as an industrial coating, as a protective coating, as a self-cleaning coating, as an anti-oxidant coating, or any combination thereof. The coatings may be applied to any substrate, the substrate being an article, an object, a vehicle or a structure. Although no particular limitation is imposed on the substrate to be used in the present disclosure, glasses, plastics, metals, ceramics, wood, stones, cement, fabric, paper, leather, and combinations or laminations thereof may be used. The coating may be applied to a substrate by spraying, dipping, rolling, brushing, or any combination thereof.

In some embodiments, a method of preparing a coating composition may involve a two-step process: contacting the vinyl isocyanate monomer with a blocking agent to form an ester monomer with blocked isocyanate groups; and polymerizing the ester monomer to form the coating composition. The vinyl isocyanate monomer may be isocyanatoethyl acrylate, isocyanatoethyl methacrylate, isocyanatopropyl acrylate, isocyanatopropyl methacrylate, or a combination thereof. An example vinyl isocyanate that may be used in the preparation is 2-methyl-acrylic acid 2-isocyanato-ethyl ester. The blocking agent may be any of the blocking agents described herein. The blocking agent may be dissolved in a solvent such as chloroform. An illustrative blocking agent that may be used in the preparation may be 3,4-dimethyl-1H-pyrazole.

The vinyl isocyanate monomer is reacted with a cold solution of blocking agent dissolved in a solvent for several, hours with mixing. The reaction temperature is kept low during the process and the product is de-colorized and purified. In some embodiments, the blocking agent and the vinyl, isocyanate monomer may be mixed in a molar ratio of about 1:0.5 to about 1:1.5, of about 1:0.5 to about 1:1.25, of about 1:0.5 to about 1:1, of about 1:0.5 to about 1:0.975, of about 1:0.5 to about 1:0.75. Specific examples include, for example, about 1:0.5, about 1:0.75, about 1:0.975, about 1:1, about 1:1.25, about 1:1.5 and ranges between (and including the endpoints) any two of these values. The mixing may be performed for about 2 hours, for about 3 hours, for about 4 hours, for about 5 hours, for about 6 hours or for about 8 hours, in some embodiments, the temperature of the reaction may be below 30° C., below 28° C., below 27° C. or below 25° C. In some embodiments, the solvent such as chloroform may be removed from the reaction mixture after the reaction process. In some embodiments, the ester monomer product may be de-colorized by passing the product through a de-coloring agent, such as activated carbon, alumina, sodium hypochlorite or the like, in some embodiments, the ester monomer may be further purified by distillation. An example of an ester monomer with blocked isocyanate group is 2-methyl-acrylic acid 2-[(3,4-dimethyl-pyrazole-1-carbonyl)-amino]-ethyl ester.

The polymerization of the ester monomer may be performed by, for example, emulsion polymerization process. This involves heating a mixture containing water, an initiator, and a surfactant and adding the ester monomer dropwise to the mixture with constant stirring. The initiator/surfactant mixture and ester monomer are vigorously mixed to form micelles. The rate at which the monomer is added may be varied to obtain micelles of different sizes which influence film formation. In some embodiments, the mixture is heated to a tempera tore of about 50° C. to about 95° C., about 50° C. to about 50° C., or about 50° C. to about 70° C. Specific examples include about 50° C., about 60° C., about 70° C., about 74° C., about 80° C., about 95° C., and ranges between (and including the endpoints) any two of these values. The mixing process may be performed for about 1 hour to about 12 hours, for about 1 hour to about 8 hours, for about 1 hour to about 6 hours, or for about 1 hour to about 4 hours. Specific examples include about 1 hour, about 2 hours, about 4 hours, about 6 hours, about 7 hours, about 8 hours, about 9 hours, about 12 hours, and ranges between (an including the endpoints) any two of these values. Some of the surfactants that may be used in the process are dodecyl sulfate, alkyl phenol ethoxylate, sodium lauryl sulfate, dodecylbenzene sulfonate, polyoxyethylene alkyl ethers, polyoxyethylene alkyl allyl ethers, acetylene glycols, polyoxyethylene, polyoxypropylene or any combination thereof. Examples of initiators that may be used include, but are not limited to, benzoyl peroxide, persulfates, water soluble azo initiators, water soluble peroxides, a persulfate redox systems or any combination thereof. The resulting product is an emulsion containing polymer particles suspended in water. Various additives such as, for example, pigments, coalescing agents, rheology modifiers, fungicide, plasticizers, nitrates and the like that are described herein may be added. When the coating is applied on a substrate, the water evaporates and the polymer particles of the emulsion coalesce to form a solid film.

An example coating embodiment is illustrated in FIG. 3. The film surface is hydrophobic in nature, but when exposed to atmospheric water it quickly loses its blocking moieties due to hydrolysis. The removal of the blocking moieties results in a surface with amino groups, which are hydrophilic. As the surface of the film is worn further, more amino groups are formed. Thus, the hydrophilic nature of the film's surface is renewed while the bulk of the film remains hydrophobic. In addition, the amino groups may protect the substrate from corrosion by reacting with acids to form salts. The amino groups can further oxidize into nitroso and nitro derivatives, which are hydrophilic in nature. Thus, the hydrophilic nature of the surface is maintained in a wide variety of conditions. The coatings of the present disclosure makes it easier to clean objects and to preserve their original appearance, and protects them from corrosion.

EXAMPLES

Example 1

Preparation of Vinyl Monomer with Blocked Isocyanate Groups Isocyanate Groups

A 10% solution of 3,5-dimethylpyrazole was prepared using a freshly distilled chloroform and a freshly distilled 3,5-dimethyl-1H-pyrazole. The solution was prepared under dry argon and was cooled to about 1-3° C. on an ice bath. A solution of 2-methyl-acrylic acid 2-isocyanatoethyl ester was added drop wise (0.05 mL/2 seconds) to the chloroform/3,5-dimethyl-1H-pyrazole solution. The molar ratio of the ester and 3,5-dimethyl-1H-pyrazole in the reaction was 0.975:1. The solution was stirred under dry argon for six hours and the solution was slowly warmed to 20° C. The chloroform was then removed by rotary evaporation using dry ice trap. Temperature of the bath was maintained below 27° C. at this step. A light yellow viscous liquid was obtained and the liquid was de-colorized by adding activated carbon and filtering it. The resulting colorless clear liquid was then distilled under vacuum ($10^{-6}$ torr) to obtain 2-methyl-acrylic acid 2-[3,4-dimethyl-pyrazole-1-carbonyl)-amino]-ethyl ester.

Example 2

Emulsion Polymerization

The reaction process has the following components: a pre-emulsion mix containing 470 grams of 2-methyl-acrylic acid 2-[(3,4-dimethyl-pyrazole-1-carbonyl)-amino]-ethyl ester, 3.36 grams of nonylphenol polyglycol ether, 0.66 grams of nonylphenol polyglycol ether sodium sulfate. 75.8 grains of water and 0.91 grains of lauryl mercaptan; and an initiator/surfactant mix containing 16.1 grams of nonylphenol polyglycol ether, 3.14 grams of nonylphenol polyglycol ether sodium sulfate, 1.34 grams of polyvinyl alcohol, 2.35 grams of sodium bicarbonate, 33.8 grams of tert-butyl hydroperoxide, 33.8 grams of formaldehyde sulphoxylate and 120.6 grams of water. The initiator/surfactant mix is pre-heated to a temperature of about 74° C. in a jacketed glass reactor and the pre-emulsion mix is slowly added dropwise with constant vigorous mixing. The reaction temperature is slowly raised to 90° C. and the mixing is performed for 6 hours. The resulting emulsion is cooled.

Example 3

Emulsion Polymerization

The reaction process has the following components: a pre-emulsion mix containing 470 grams of 2-methyl-acrylic acid 2-[4-methyl-imidazole-1-carbonyl)-amino]-ethyl ester, 3.36 grams of nonylphenol polyglycol ether, 0.66 grams of nonylphenol polyglycol ether sodium sulfate, 75.8 grams of water and 0.91 grams of lauryl mercaptan; and an initiator/surfactant mix containing 16.1 grams of nonylphenol polyglycol ether, 3.14 grams of nonylphenol polyglycol ether sodium sulfate, 1.34 grams of polyvinyl alcohol, 2.35 grams of sodium bicarbonate, 33.8 grams of tert-butyl hydroperoxide, 33.8 grams of formaldehyde sulphoxylate and 120.6 grams of water. The initiator/surfactant mix is pre-heated to a temperature of about 74° C. in a jacketed glass reactor and the pre-emulsion mix is slowly added dropwise with constant vigorous mixing. The reaction temperature is slowly raised to 90° C. and the mixing is performed for 6 hours. The resulting emulsion is cooled.

Example 4

Evaluation of Hydrophilic Property

The hydrophilic coating containing the blocked isocyanate acrylate polymer of Example 2 is coated on a glass surface and dried in an oven at 100° C. for 10 minutes. The surface free energy and the water droplet contact angle of the hydrophilic coating is measured as follows. A Zisman plotting method is employed for measuring surface free energy. The surface tension of various concentration of the aqueous solution of magnesium chloride is plotted along the X-axis and the contact angle in terms of cos θ is plotted along the Y-axis. A graph with a linear relationship between the two is obtained. The graph is extrapolated such that the surface tension at contact angle 0° is measured and is defined as the surface tree energy of the solid. The surface free energy of the glass surface will be 86 milliNewtons/meter.

Example 5

Evaluation of Hydrophilic Coating

The hydrophilic coating containing 2-methyl-acrylic acid 2-[(3,4-dimethyl-pyrazole-1-carbonyl)-amino]-ethyl ester polymer is coated on a glass substrate and evaluated for the following properties.

Hydrophilicity: The water droplet contact angle in air is measured by using DropMaster 500 (Kyowa Interface Science Co., Ltd). The water droplet contact angle measured will be 8°.

Water resistance: The hydrophilic coating is subjected to a rubbing treatment with sponge in 10 reciprocations in water while applying a load of 1 kg, and the amount of residual film is calculated from a change of weight before and after the rubbing treatment. The weight of the film after rubbing treatment will be 97% of the initial weight.

Weather resistance: The hydrophilic crating is exposed in a chamber to a xenon arc lamp that is calibrated to mimic the sun spectral characteristics (Atlas Sun Test). The exposure is performed for 500 hours and evaluated with respect to hydrophilicity, water resistance and durability. The hydrophilic coating will exhibit same properties before and after the exposure.

Example 6

Measuring Self-Cleaning Properties

The self-cleaning properties of each paint sample is investigated based on its ability to degrade the organic dye methylene blue. As the dye is degraded to water, carbon dioxide, and nitrogen containing species, a loss of color is observed. The photoactivity is monitored by measuring the brightness. The protocol is as follows: a film of paint is coated on a substrate such as a glass plate. The film thickness is similar to that used in the final application and generally not less than 25 microns thick when dry and the paint film is allowed to dry overnight. A solution of methylene blue in water (0.373 grams/L) is prepared and applied on the coated substrate and allowed to sit for about 60 minutes. The excess of methylene blue solution is removed, and the substrate surface is dried and the brightness value of the surface is measured. The substrate surface is exposed to UV light for about 48 hours at an intensity of 30 to 60 W/m$^2$ (300-400 nm wavelengths) and the brightness value is re-measured. The brightness value will be 22% less than) the initial value, thus demonstrating the cleaning power of the coating.

Example 7

Anti-Fouling Properties

A hydrophilic coating 2-methyl-acrylic acid 2-[(3,4-dimethyl-pyrazole-1-carbonyl)-amino]-ethyl ester polymer is coated, on a concrete surface. After drying the paint, the surface is exposed to running water for one month. At the end of the period, the concrete surface is checked for visible peeling of the paint and growth of organisms such as algae.

Example 8

An Object Coated with Hydrophilic Paint

A metal table is painted with a hydrophilic coating containing a vinyl polymer with blocked isocyanate groups (Example 3) and is allowed to dry at room temperature. The surface free energy of the chair is measured as explained in Example 4 and will be 84 milliNewton/meter. Tire anti-fouling property of the coating is measured as follows: A line is drawn on the coated table using oily ink. A similar line is also drawn on a table which is not coated. A water jet is continuously applied on both the surfaces and periodically checked whether the oily line is erased. The oily ink applied on the coated table will be erased after 1 minute whereas the oily line on the un-coated table will be present.

In the above detailed description, reference is made to the accompanying drawings, which form a part hereof, in the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein, it will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural, references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled, to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended, as "open" terms (e.g., the term "including" should be interpreted as "including but not limited to," the term "having" should be interpreted as "having at least," the term "includes" should be interpreted as "includes but is not limited to," etc). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases 'at least one' and 'one or more' to introduce claim recitations. However, the use of such phrases should not be construed to imply that the introduction of a claim recitation, by the indefinite articles 'a' or "an" limits any particular claim containing such introduced claim recitation to embodiments containing only one such recitation, even when the same claim includes the introductory phrases "one or more" or 'at least one' and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill, in the art would understand the convention (e.g. "a system having at least one of A, B, or C" would include but not be limited to systems that have A alone, B alone, C alone, A and B together, A and C together, B and C together, and/or A, B, and C together, etc.), it will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A coating composition comprising:
   a dried film comprising a polymer comprising polymerized ester monomers comprising a blocked isocyanate group, wherein the ester monomers comprise a vinyl group and the blocked isocyanate group is formed from isocyanate and a blocking agent; wherein the dried polymer film surface comprises the blocked isocyanate groups.

2. The composition of claim 1, wherein the blocked isocyanate groups are present within side chains of the polymer.

3. The composition of claim 1, wherein the blocking agent is an imidazole, a methyl imidazole, a pyrazole, a pyrrole, a pyrrolidine, a morpholine, a pyridine, a piperidine, an alkyl malonate ester, an acetoacetic ester, a cyanoacetic ester, an oxime, a caprolactam, or any combination thereof.

4. The composition of claim 1, wherein the polymer is a polymerization product of 2-methyl-acrylic acid 2-[(3,4-dimethyl-pyrazole-1-carbonyl)-amino]-ethyl ester.

5. The composition of claim 1, further comprising a pigment, a coalescing agent, a fungicide, a rheology modifier, a plasticizer, or a surfactant, or any combination thereof.

6. The composition of claim 1, wherein the vinyl isocyanate is one or more compounds selected from the group consisting of: isocyanatoethyl acrylate, isocyanatoethyl methacrylate, isocyanatopropyl acrylate, and isocyanatopropyl methacrylate.

7. The composition of claim 1, wherein the composition does not contain one or more of the following: cycloaliphatic polysilicate, aliphatic polysilicate, polymer lacking isocyanate groups, or UV initiator.

8. The composition of claim 1, wherein the polymer is an alkyl methacrylate polymer, an allyl methacrylate polymer, a vinyl methacrylate polymer, a thioethyl methacrylate polymer, a vinyl benzene polymer, or any combination thereof.

9. The composition of claim 1, wherein the composition provides a renewable hydrophilic, self-cleaning and anti-oxidant coating to a substrate surface.

10. The composition of claim 1, wherein a portion of the blocked isocyanate groups on the dried polymer film surface have been hydrolyzed to hydrophilic amino groups.

\* \* \* \* \*

UNITED STATES PATENT AND TRADEMARK OFFICE
CERTIFICATE OF CORRECTION

| | | |
|---|---|---|
| PATENT NO. | : 9,193,874 B2 | Page 1 of 2 |
| APPLICATION NO. | : 13/700683 | |
| DATED | : November 24, 2015 | |
| INVENTOR(S) | : Carlson et al. | |

It is certified that error appears in the above-identified patent and that said Letters Patent is hereby corrected as shown below:

Specification

In Column 1, Line 4, delete "CLAIM OF PRIORITY" and insert -- CROSS-REFERENCE TO RELATED APPLICATION --, therefor.

In Column 1, Line 7, delete "§371" and insert -- § 371 --, therefor.

In Column 1, Line 15, delete "paints sue" and insert -- paints are --, therefor.

In Column 1, Line 65, delete "crating comprises" and insert -- coating comprises --, therefor.

In Column 4, Line 22, delete ""Fillers". Pigments" and insert -- "fillers". Pigments --, therefor.

In Column 5, Line 36, delete "tempera tore" and insert -- temperature --, therefor.

In Column 5, Line 37, delete "about 50° C.," and insert -- about 80° C., --, therefor.

In Column 6, Line 18, delete "Isocyanate Groups Isocyanate Groups" and insert -- Isocyanate Groups --, therefor.

In Column 7, Line 52, delete "crating is" and insert -- coating is --, therefor.

In Column 8, Line 14, delete "than) the" and insert -- than the --, therefor.

In Column 8, Lines 36-37, delete "Tire anti-fouling" and insert -- The anti-fouling --, therefor.

In Column 9, Line 9, delete "plural, references" and insert -- plural references --, therefor.

Signed and Sealed this
Twenty-eighth Day of June, 2016

Michelle K. Lee
*Director of the United States Patent and Trademark Office*

CERTIFICATE OF CORRECTION (continued)
U.S. Pat. No. 9,193,874 B2

In Column 9, Line 15, delete "entitled, to" and insert -- entitled to --, therefor.

In Column 9, Lines 33-34, delete "intended, as" and insert -- intended as --, therefor.